United States Patent
Lee et al.

(10) Patent No.: US 6,411,469 B1
(45) Date of Patent: *Jun. 25, 2002

(54) TRANSDUCER SUSPENSION SYSTEM WITH HIGH CONDUCTIVITY LEADS HAVING TWO LAYERS

(75) Inventors: Edward Hin Pong Lee; Randall George Simmons, both of San Jose, CA (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/965,061
(22) Filed: Nov. 5, 1997
(51) Int. Cl.[7] .................................. G11B 5/48
(52) U.S. Cl. .................................. 360/244.3
(58) Field of Search ............... 360/104, 244.3; 216/13, 20

(56) References Cited

U.S. PATENT DOCUMENTS

| | | | |
|---|---|---|---|
| 5,140,482 A | * | 8/1992 | Kimura et al. ............... 360/104 |
| 5,666,717 A | * | 9/1997 | Matsumoto et al. ..... 29/603.12 |
| 5,699,212 A | * | 12/1997 | Erpelding et al. ....... 360/97.02 |
| 5,862,010 A | * | 1/1999 | Simmons et al. ........ 360/97.01 |

FOREIGN PATENT DOCUMENTS

JP  408138338  *  5/1996

* cited by examiner

Primary Examiner—David Davis
(74) Attorney, Agent, or Firm—Douglas R. Millett; Abdy Raissinia; Esther E. Klein

(57) ABSTRACT

A transducer suspension system has a transducer head, layered member, and a load beam. The layered member is comprised of a support layer, an electrically insulating layer, an electrically lead base layer, and an electrically conducting layer. The electrical leads are formed from the combination of the base layer and electrically conducting layer. The resulting electrical leads are both flexible and highly conductive.

20 Claims, 4 Drawing Sheets

TRANSDUCER SUSPENSION SYSTEM WITH HIGH CONDUCTIVITY LEADS HAVING TWO LAYERS

BACKGROUND OF THE INVENTION

1. Field of the Invention

This invention relates generally to transducer suspension systems and more particularly to electrical leads for such systems.

2. Description of Prior Art

Direct access storage devices (DASD), or disk drives, store information on concentric tracks of a rotatable magnetic recording disk. A magnetic head or transducer element is moved from track to track to record and read the desired information. Typically, the magnetic head is positioned on an air bearing slider which flies above the surface of the disk as the disk rotates. In some recently proposed disk drives, the slider (or carrier) rides on a liquid film or bearing on the disk. A suspension assembly connects the slider to a rotary or linear actuator. The suspension provides support for the slider.

References which are relevant to transducer suspensions include: U.S. Pat. No. 5,557,489, issued Sep. 17, 1996, by Nakashima et al; U.S. Pat. No. 5,493,074, issued Feb. 20, 1996, by Murata et al; U.S. Pat. No. 5,491,597, issued Feb. 13, 1996, by Bennin et al; U.S. Pat. No. 5,422,764, issued Jan. 6, 1995, by McIlvanie; U.S. Pat. No. 5,384,432, issued Jan. 24, 1995, by Noro, et al; U.S. Pat. No. 4,996,623, issued Feb. 26, 1991, by Erpelding et al; U.S. Pat. No. 4,863,808, issued Feb. 5, 1989 by Sallo; U.S. Pat. No. 4,819,094, issued Feb. 4, 1989, by Oberb; U.S. Pat. No. 4,761,699, issued Aug. 2, 1988, by Ainslie et al; U.S. Pat. No. 4,703,392, issued Oct. 27, 1987 by Robertson; U.S. Pat. No. 4,543,295, issued Sep. 24, 1985, by Sainte Claire et al; U.S. Pat. No. 1,386,834, issued Aug. 9, 1921 by Beckert; Japanese Application 53-30310, published Mar. 22, 1978, by Takahashi; Japanese Application 6-124558, published May 6, 1994 by Kodaira; Japanese Application 03-347522, published Sep. 28, 1993, by Koomia; Japanese Application 03-193765, published Nov. 18, 1992, by Tadahiro et al; Japanese Application 03-53071, published Oct. 14, 1992, by Wakita et al; Japanese Application 51-104787, published Mar. 22, 1978 by Minoru et al; IBM Technical Disclosure Bulletin, Volume 8, No. 8, January 1966, page 1025, by Webb et al.

The suspension must meet several requirements. The suspension must be flexible and provide a bias force in the vertical direction. This is necessary to provide a compensating force to the lifting force of the air bearings in order to keep the slider at a correct height above the disk. Also, vertical flexibility is needed to allow the slider to be loaded and unloaded away from the disk. Another requirement of the suspension is that it must provide a pivotal connection for the slider. Irregularities in operation may result in misalignment of the slider. The slider is able to compensate for these problems by pitching and/or rolling slightly to maintain the proper orientation necessary for the air bearing. Another requirement of the suspension is that it must be rigid in the lateral direction. This is needed to prevent the head from moving from side to side, which would result in the head reading the wrong track.

Disk drives have become smaller in size and their recording track density has increased dramatically. This has necessitated the use of smaller and smaller heads and suspensions. The smaller size makes it more difficult to string individual wires along the suspension to the head. Recently, it has been proposed that electrical leads be etched directly into the suspension in order to do away with the need to string separate wires. One requirement of these etched leads is that they must be both flexible and highly conductive.

SUMMARY OF THE INVENTION

Briefly, in a preferred embodiment of the present invention, a suspension system comprises a rigid load beam member and a layered member. The layered member is comprised of at least four layers: a support layer, an electrically insulating layer, an electrical lead base layer, and an electrically conducting layer. The layered member is etched such that the electrical leads are formed from a combination of the base layer and the conductive layer. The base layer is made of a strong, flexible material which allows the leads to be bent. This is important since leads must be flexible for purposes of manufacture and during operation of the suspension. The electrical conducting layer is made of a highly conductive material which allows for optimum transmission of electrical signals along the leads.

For a fuller understanding of the nature and advantages of the present invention, reference should be made to the following detailed description taken in conjunction with the accompanying drawings.

DESCRIPTION OF THE PREFERRED EMBODIMENTS

Figure 1:
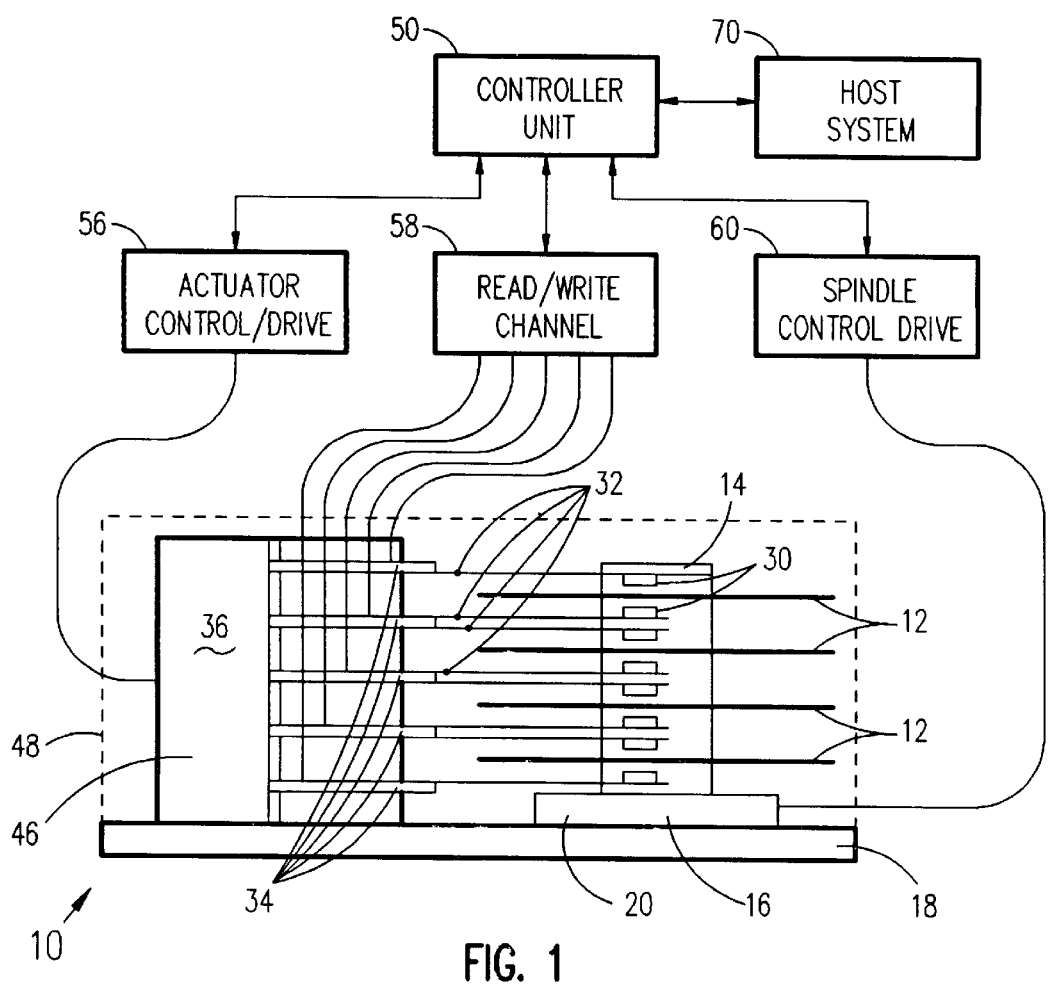
FIG. 1 is a schematic diagram of a data storage system of the present invention.
Figure 2:
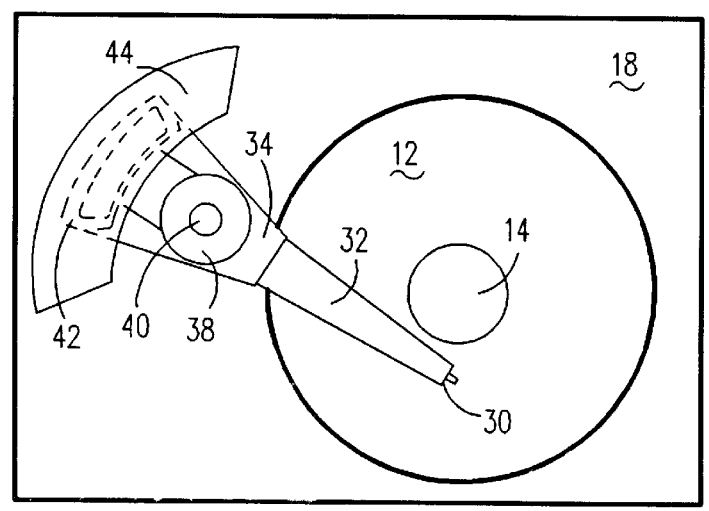
FIG. 2 is a top view of the system of FIG. 1.

FIGS. 1 and 2 show schematic diagrams of the data storage system of the present invention which is designated by the general reference number 10. System 10 comprises a plurality of magnetic recording disks 12. Each disk has a plurality of concentric data tracks. Disks 12 are mounted on a spindle motor shaft 14, which is connected to a spindle motor 16. Motor 16 is mounted to a chassis 18. The disks 12, spindle 14, and motor 16 comprise a disk stack assembly 20.

A plurality of read/write heads 30 are positioned over the disks 12 such that each surface of the disks 12 has a corresponding head (or slider) 30. Each head 30 is attached to one of a plurality of suspensions 32 which in turn are attached to a plurality of actuator arms 34. Arms 34 are connected to a rotary actuator 36. Alternatively, the arms 34 may be an integral part of a rotary actuator comb. Actuator 36 moves the heads in a radial direction across disks 12. Actuator 36 typically comprises a rotating member 38 mounted to a rotating bearing 40, a motor winding 42 and motor magnets 44. Actuator 36 is also mounted to chassis 18. Although a rotary actuator is shown in the preferred embodiment, a linear actuator could also be used. The heads 30, suspension 32, arms 34 and actuator 36 comprise an actuator assembly 46. The disk stack assembly 20 and the actuator assembly 46 are sealed in an enclosure 48 (shown by a dashed line) which provides protection from particulate contamination.

A controller unit 50 provides overall control to system 10. Controller unit 50 typically contains a central processing unit (CPU), memory unit and other digital circuitry. Controller 50 is connected to an actuator control/drive unit 56 which in turn is connected to actuator 36. This allows controller 50 to control the movement of heads 30 over disks 12. The controller 50 is connected to a read/write channel 58 which in turn is connected to the heads 30. This allows controller 50 to send and receive data from the disks 12. Controller 50 is connected to a spindle control/drive unit 60 which in turn is connected to spindle motor 16. This allows controller 50 to control the rotation of disks 12. A host system 70, which is typically a computer system, is connected to the controller unit 50. System 60 may send digital data to controller 50 to be stored on disks 12, or may request the digital data be read from disks 12 and sent to the system 70. The basic operation of DASD units is well known in the art and is described in more detail in "Magnetic Recording Handbook", C. Dennis Mee and Eric D. Daniel, McGraw Hill Book Company, 1990.

Figure 3:
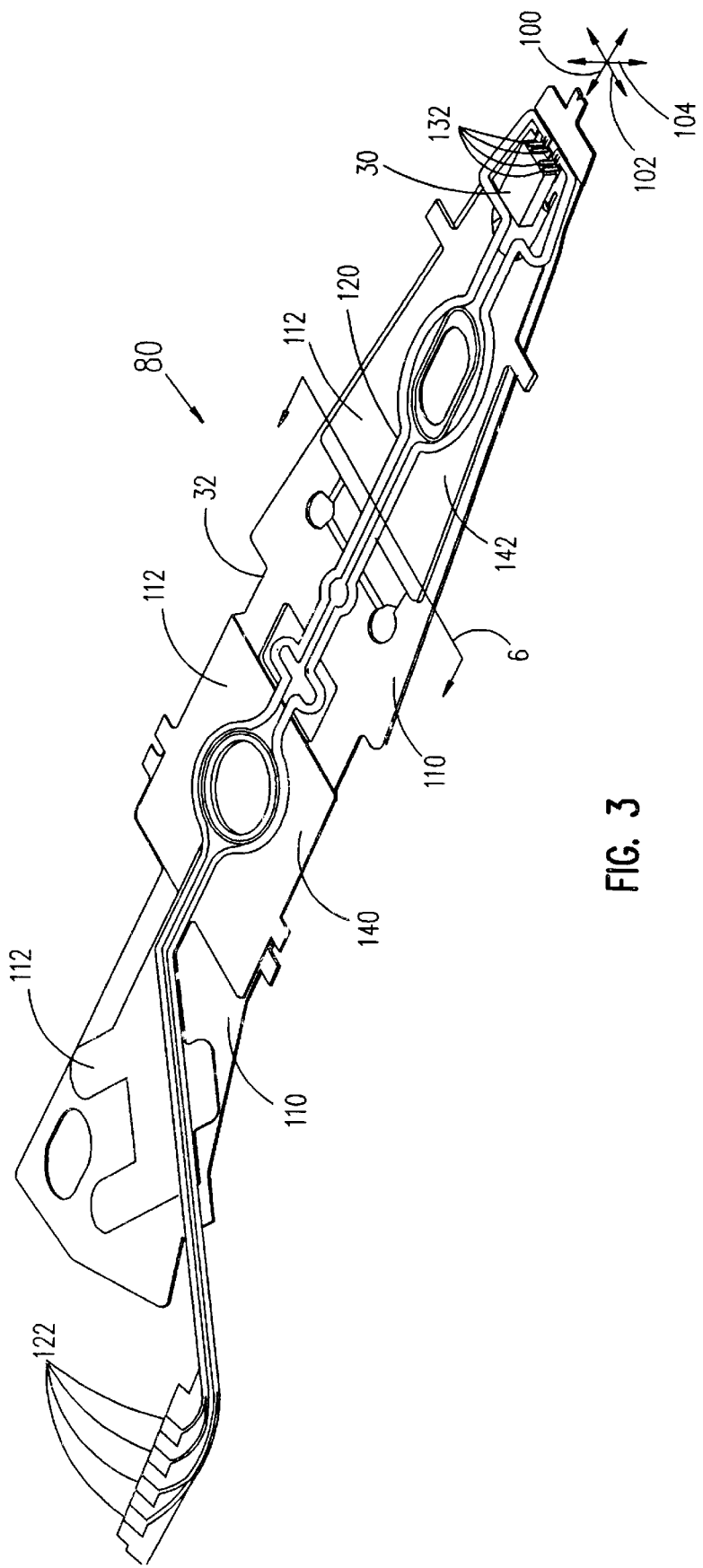
FIG. 3 is a detailed perspective view of a suspension system of FIG. 1.

FIG. 3 shows a perspective view of a head 30 attached to a suspension 32. This combination is referred to as a suspension assembly or head gimbal assembly (HGA) 80, Suspension 32 has a longitudinal axis 100, a lateral axis 102 and a perpendicular axis 104. Suspension 32 is comprised of a load beam 110 and a layered member 112. Layered member 112 is formed from a multi-layer material. Various layers of member 112 are etched away in a photolitographic process to form the desired shapes.

The suspension assembly 80 is extremely small. The distance from the end of the actuator arm 34 to the end of the suspension is typically on the order of 15 mm. The head 30 typically measures 1.25 mm×1.0 mm×0.3 mm.

The layered member 112 has an electrical lead layer, electrical insulating layer, and support layer. The electrical lead and electrical insulating layers are etched to form electrical lines (or leads) 120 which run from the rear termination pad area 122 to the head 30. Head 30 is comprised of a slider and transducer electronics. The electrical lines 120 terminate and are electrically attached to the head 30 at the head termination pads 132. The electrical lines 120 are bent vertically upward at the head termination pads 132. The support layer at laminated member 112 is formed into a rear member 140 and a flexure member 142 which are welded onto load beam 110. Rear member 140 is attached to actuator arm 34 by an adhesive, welding or swaging process. Flexure member 142 provides a gimbal mount for attachment of the head 30. The gimbal mount allows the head 30 to pivot in order to adjust its orientation (static attitude) to achieve the proper air bearing between the head 30 and disk 12 while the disk 12 is rotating. The rear member 140, flexure 142, and load beam 110 also serve the purpose of providing support for the electrical lines 120, among other purposes such as providing stiffness balance and an area for bonding or welding.

Figure 4A:
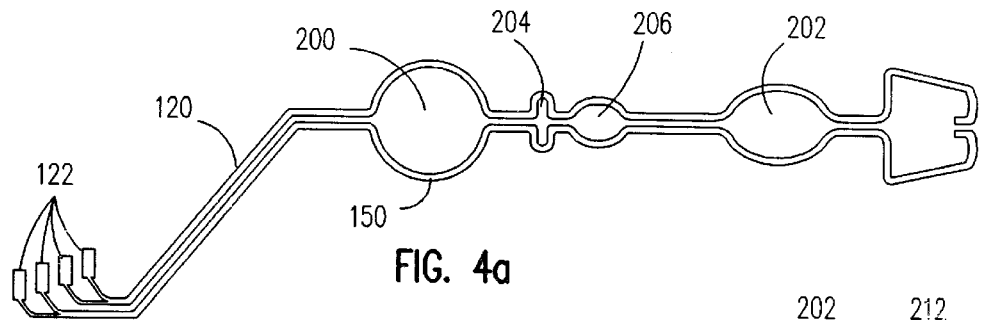
FIGS. 4a–d show top views of layers of the suspension of FIG. 1.
Figure 4B:
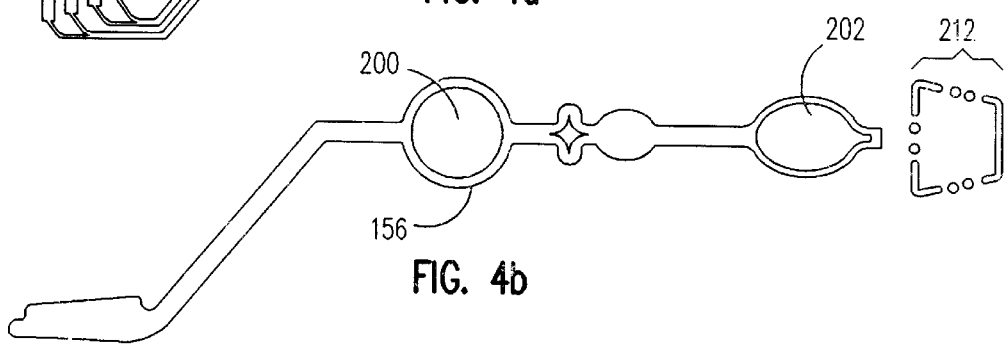
Figure 4C:
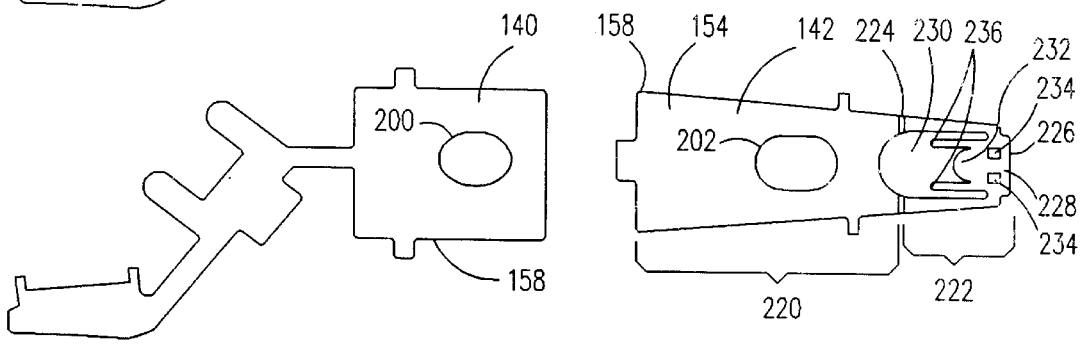

FIGS. 4a–4d show top views of the various element layers of suspension 32. FIGS. 4a–4c show respectively, an electrical lead layer 150, an electrical insulating layer 156, and a support layer 158 of the layered member 112. The electrical lead layer 150 is further comprised of a base layer 154 and an electrically conducting layer 152. Initially, the layers 150–158 are layers in a single sheet of material. The member 112 is then formed from the sheet by using photolithographic etch processes as are known in the art. The base layer 154 is made of a high strength material which is able to bend without breaking, but which is preferably also a conducting material. The material should have a yield strength of 60–150 Kpsi and conductivity of 13–65% International Annealed Copper Standard (IASC), (where the bulk conductivity of pure copper equals 100%). In a preferred embodiment, the material is 7026 copper alloy and has a thickness of between 4 microns and 30 microns and preferably 18 microns.

Layer 152 is made of a highly conductive material, (conductivity greater than $10^7$ S/M. In a preferred embodiment, the material is pure copper (at least 99.99% copper) and the layer has a thickness of between 2 microns and 30 microns and preferably 10 microns. The bulk conductivity of pure copper is $5.80 \times 10^7$ S/m. By depositing pure copper with the sputtering method, the copper of layer 152 can reach bulk conductivity when the thickness of layer 152 is at least 2 mm and the width of the electrical leads of layer 152 are at least 2 mm wide. Layer 156 is made of an electrically insulating material and in a preferred embodiment is made of polyimide or Teflon and each layer has a thickness of between 0.005 mm and 0.018 mm and preferably 0.018 mm. Layer 158 is made of a thin stiff material which is able to bend slightly, and in a preferred embodiment is made of stainless steel and has a thickness of between 0.018 mm and 0.051 mm and is preferably 0.02 mm.

Referring now to FIG. 4a. Two electrical leads 120 are formed in layer 150. The lines 120 start at the termination pad area 122. Pads 122 provide connection to the read/write channel 58. The pads 122 are located on the side of the actuator arms 34 when the drive is fully assembled. The lines 120 run from the side of the arm 34 toward the center longitudinal axis 100 of the suspension 32. Lines 120 then run in a generally longitudinal direction towards the head 30.

The lines separate to run along both sides of apertures 200, 202 and 206. The apertures 200, 202 and 206 are used to provide access for tooling pins which are used to align the laminated member and the load beam during manufacture. Another separation of lines 120 occurs at points 204 and is used to lessen the stress in lines 120 due to movement of the suspension during operation.

At the distal end of suspension 32, the lines 120 separate and run along either side of the head 30, then turn backward to the head 30 to terminate at the rear face of head 30 at the head termination pads 132. This is necessary because the transducer electronics are located on the rear face of the slider. This rear face of the slider is a trailing face as the disk rotates beneath the suspension during operation. Lines 120 are bent 90° vertically in order to interface with the pads 132.

FIG. 4b shows a top view of the electrically insulating layer 156. Layer 156 is shaped to provide electrical insulation protection to the lines 120 of layer 150 which directly overlay the layer 156. Layer 156 forms an insulating strip 210 directly beneath the lines 120 of layer 150. At the head area, layer 156 is shaped into a series of pads 212 which underlie lines 120. This is done to allow the lines 120 to be more flexible at the head area in order to minimize the change of static attitude of the head caused by the exertion of force of the lines 120 under different temperature and humidity conditions.

FIG. 4c shows a top view of the support layer 158. Rear member 140 provides support for the rear section of the lines 120. Flexure member 142 has a rear portion 220 and a front portion 222. The front portion 222 is raised slightly above the plane of the rear portion 220 by means of a stamped bend 224. The front portion 222 has a distal end 226 having a front platform 228 which provides support for lines 120. Behind platform 228 is a flexure aperture 230. A tongue section 232 provides support and an attachment point for head 30. Between tongue section 232 and platform 228 are a pair of rectangular apertures 234. Apertures 234 allowed the lines 120 to bend as they approach the termination pads 132. A pair of tabs 236 extend from tongue section 232 and function as motion limiters when they are bent back under load beam 110.

Figure 4D:
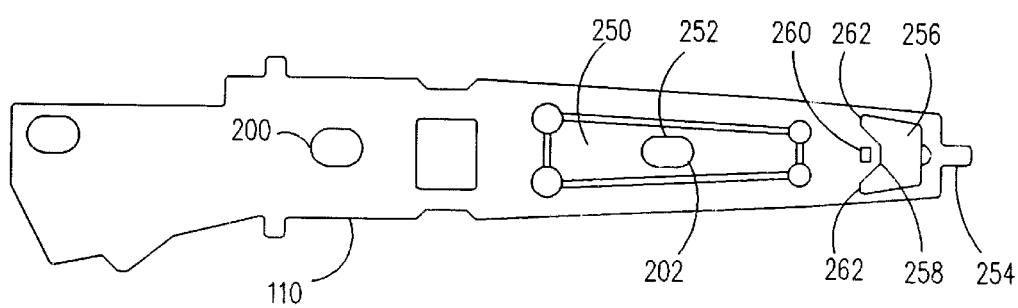

FIG. 4d shows a top view of load beam 110. Load beam 110 is generally flat and rigid and made of a stainless steel or other rigid material. In a preferred embodiment, the load beam 110 is stainless steel of about 0.025 to 0.076 mm thick and preferably 0.38 mm. It is desirable to maintain the weight and inertia of the load beam 110 as small as possible without comprising its structural rigidity.

Load beam 110 has a depressed section 250 which is used to provide additional structural stiffness. Section 250 has an aperture 252 which is used for tool alignment during the manufacturing process.

Beam 110 has a distal end with a tab 254 which is used for merge and dynamic loading and unloading of the suspension. An aperture 256 is located behind tab 254. A tongue section 258 extends into aperture 256. A stamped raised button or dimple 260 is located on tongue 258. Dimple 260 contacts tongue section 232 of flexure member 142 and allows head 30 to gimbal (pitch and roll) slightly such that it is able to maintain the proper air bearing orientation. A pair of corners 262 of aperture 256 provide a contact point for tabs 236 of flexure 142 such that tabs 236 pass under load beam 110 and provide a motion limiting function for the flexure member 142. Beam 110 is also formed by a photolithographic process and the raised features are stamped. The laminated member 112 and the load beam 110 are attached by welding. The head 30 is attached by flexure tongue 232 by adhesive.

Figure 5:
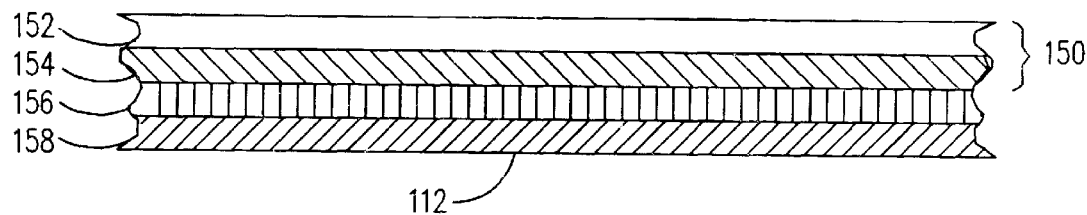
FIG. 5 is a cross sectional view of a layered material.

FIG. 5 shows a cross sectional view of a layered sheet 300. Sheet 300 is the layered material which is used to form the layered member 112. Sheet 300 contains layers 150–158 and the sheet 300 is then used to form the member 112 by photolithographic etch processes. In a preferred embodiment, the layers 154, 156 and 158 are formed together in a laminated sheet. The layer 152 is then sputtered onto the top surface of layer 154. Alternatively, the layer 152 can be electroplated.

Figure 6:
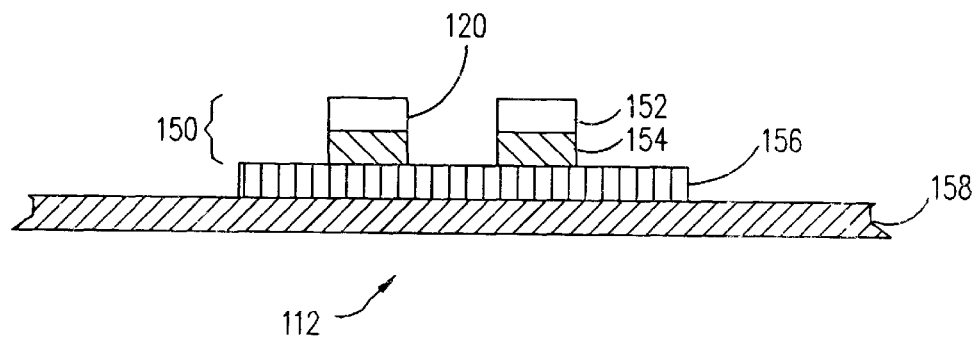
FIG. 6 is a cross sectional view of a layered member of a suspension of FIG. 1.

FIG. 6 shows a cross sectional view of laminated member 112. Starting with laminated sheet 300, a photoresist is applied to the top surface of layer 150. The photoresist is then patterned with a photolithographic mask such that only the areas for lines 120 (the areas where material is to remain) are exposed. The unexposed photoresist is then removed from the areas surrounding lines 120. The material is etched away such that the material around lines 120 is removed. The developed and hardened photoresist protecting lines 120 is then removed. A similar series of steps is repeated for each layer such that each layer achieves the required geometry.

The resulting suspension has integral electrical leads 120 which are both flexible and electrically conductive. The base layer is made of the strong flexible material which allows the leads to be bent. This is important since the lead must be flexible in order to withstand the rigors of the manufacturing process. For example, the leads are bent vertically 90° for attachment to the head 30 at the front of the suspension. Also, during operation of the disk drive, the suspension 32 may have some vertical displacement and in addition the head 30 will pitch and roll. The flexible base layer of the electrical leads allows the electrical leads to flex in response to these motions.

The electrical leads are also highly conductive. The electrically conducting layer be made of a highly conducting material such as pure copper. This provides a very good conduction of the electrical signals which is critical to proper operation of the disk drive.

While the preferred embodiments to the present invention have been illustrated in detail, it should be apparent that modifications and adaptations to those embodiments may occur to one skilled in the art without departing from the scope of the present invention as set forth in the following claims.

We claim:

1. A suspension system comprising:
   a load beam member having a first end and a second end, the first end for attachment to a support member;
   a laminated member attached to the load beam member, the laminated member comprised of a support layer, an electrically insulating layer overlying the support layer, and an electrically conducting layer overlying the electrically insulating layer, the support layer having a portion for receiving a transducer member, the electrically conducting layer comprised of a base layer material which is electrically conducting, strong and flexible and is formed into a plurality of electrical leads which run from the first end of the load beam to the transducer; and
   a deposited layer overlying the electrical leads, the deposited layer comprised of a material which is more electrically conductive, less strong and less flexible than the electrically conducting base layer.

2. The system of claim 1, wherein the electrically conducting layer consists of a high strength copper alloy.

3. The system of claim 1, wherein the deposited layer consists of pure copper.

4. The system of claim 1, wherein the deposited layer is sputtered on to the electrically conducting layer.

5. The system of claim 1, wherein the electrically conducting layer is made of 7026 copper alloy.

6. The system of claim 1, wherein the electrically conducting layer is between 4 mm and 30 mm thick.

7. The system of claim 1, wherein the deposited layer is between 2 mm and 30 mm thick.

8. The system of claim 1, wherein the thickness of the deposited layer is at least 2 mm and the width is at least 2 mm.

9. The system of claim 1, wherein the electrically insulating layer is made of polyimide.

10. The system of claim 1, wherein the deposited layer has a conductivity of approximately $5.80 \times 10^7$ S/M.

11. A suspension system comprising:
    a load beam member having a first end and a second end, the first end for attachment to a support member;
    a laminated member attached to the load beam member, the laminated member comprised of a support layer, an electrically insulating layer overlying the support layer, and an electrically conducting layer overlying the electrically insulating layer, the support layer having a portion for receiving a transducer member, the electrically conducting layer comprised of a base layer formed from a material which is electrically conducting, strong and flexible and is formed into a plurality of electrical leads which run from the first end of the load beam to the transducer;
    a deposited layer overlying the electrical leads, the deposited layer comprised of a material which is more electrically conductive, less strong and less flexible than the base layer;
    a transducer element attached to the laminated member;

a data storage disk located proximate to the transducer element;

a rotation device for rotating the disk; and a movement device for moving the transducer relative to the disk.

12. The system of claim 11, wherein the electrically conducting layer consists of a high strength copper alloy.

13. The system of claim 11, wherein the deposited layer consists of pure copper.

14. The system of claim 11, wherein the deposited layer is sputtered on to the electrically conducting layer.

15. The system of claim 11, wherein the electrically conducting layer is made of 7026 copper alloy.

16. The system of claim 11, wherein the electrically conducting layer is between 4 mm and 30 mm thick.

17. The system of claim 11, wherein the deposited layer is between 2 mm and 30 mm thick.

18. The system of claim 11, wherein the thickness of the deposited layer is at least 2 mm and the width is at least 2 mm.

19. The system of claim 11, wherein the electrically insulating layer is made of polyimide.

20. The system of claim 11, wherein the deposited layer has a conductivity of approximately $5.80 \times 10^7$ S/m.

* * * * *